(No Model.)
J. C. H. STUT.
AUTOMATIC CABLE LIFTER FOR CABLE RAILWAYS.
No. 424,832. Patented Apr. 1, 1890.
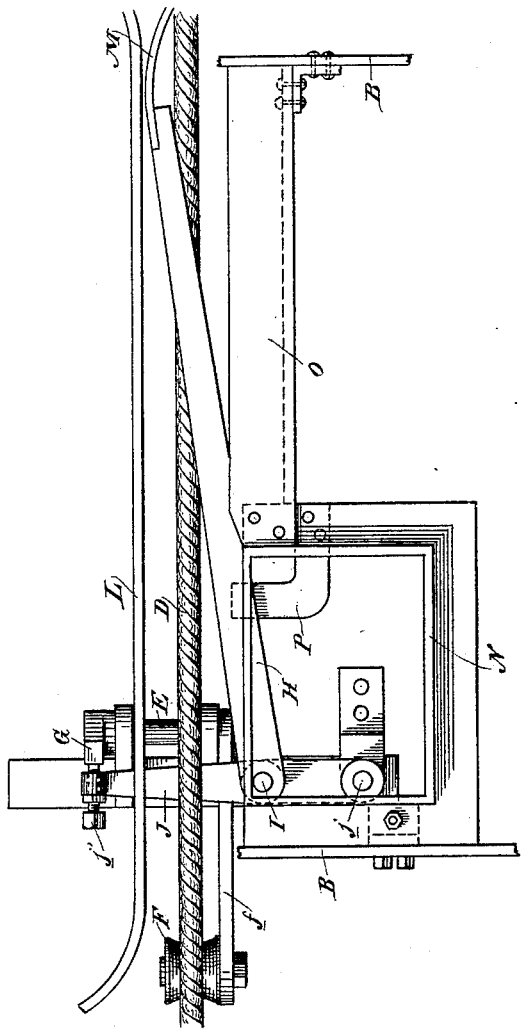
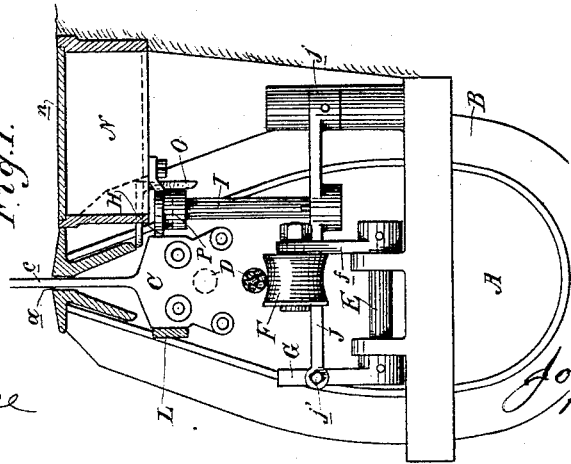

United States Patent Office.

JOHN CHRISTIAN HENRY STUT, OF SAN FRANCISCO, CALIFORNIA.

AUTOMATIC CABLE-LIFTER FOR CABLE RAILWAYS.

SPECIFICATION forming part of Letters Patent No. 424,832, dated April 1, 1890.

Application filed November 15, 1889. Serial No. 330,455. (No model.)

*To all whom it may concern:*

Be it known that I, JOHN CHRISTIAN HENRY STUT, a citizen of the United States, residing at the city and county of San Francisco, and State of California, have invented an Improvement in Automatic Cable-Lifters for Cable Railways; and I hereby declare the following to be a full, clear, and exact description thereof.

My invention relates, generally, to the class of cable railways in which a traveling cable moves within a tube or tunnel and connection is made with it by means of a suitable grip depending from the car above and passing through a continuous slot in the top of the tube or tunnel; and it relates, especially, to those devices which are used for raising the cable into the jaws of the grip. Ordinarily, when the car is running its stop is made by releasing the cable from the clamping effect of the grip, but without dropping the cable from the jaws; but at certain localities—at turn-tables, the termini of the road, and at crossings—it is necessary to cast out the cable from the jaws, so as to wholly disconnect the grip, and it then becomes necessary, when the car is to start again, to lift the cable up into the jaws of the grip.

It is the object of my invention to provide a simple and effective automatically-operating device or mechanism for raising the cable into the jaws of the grip; and to this end my invention consists in a lifting-roller mounted in the tube or tunnel under the cable, a lever in the tube or tunnel and traversing the line of the grip-slot, so that as the grip passes the lever is thrown to one side, and suitable connections between the roller and the lever, whereby the roller is raised to lift the cable into the jaws of the grip, all of which, together with details for the construction, will be hereinafter fully described, and the features of novelty specifically pointed out in the claims.

Referring to the accompanying drawings, Figure 1 is a vertical cross-section of a cable tube or tunnel, showing the parts of my mechanism in end elevation. Fig. 2 is a plan view of said parts.

A is the tube or tunnel of a cable railway, one of the yokes or ribs of which is shown by B. A continuous slot $a$, known as the "grip-slot," is made in the top of the tube or tunnel, and through this passes and travels the shank $c$ of the grip C, which is here indicated as belonging to that type of grips known as a "bottom grip"—that is to say, having its jaws so arranged as to receive the cable between them directly from beneath.

D is the cable in the tube or tunnel. Mounted in the lower portion of the tube or tunnel in suitable bearings is a rock-shaft E, to which is rigidly attached the arm $f$ of the lifting-roller F, which lies in a plane directly below the traveling cable D. The other end of this rock-shaft is provided with an upwardly-extending lever-arm G. In the upper portion of the tube or tunnel is located the operating-lever H, which in its normal position extends at an angle across the plane of the grip-slot, so that the grip in passing bears with its side against the lever and throws it to one side. This lever at its inner end is connected with the top of a vertical rod I, the lower end of which is connected with the lever-arm J, pivoted at one end in a suitable bearing at $j$ and having its other end provided with a regulating set-screw $j'$, for coming in contact with the lever-arm G of the rock-shaft E below. Now, it will be seen that as the grip passes along, its side comes in contact with the lever and forces said lever to one side, so that through the connections described the rock-shaft E below is moved and the roller F thrown up under the cable, whereby the cable is raised into the jaws of the grip. This raising of the cable takes place after the grip has passed the roller, so that the latter rises up behind the grip and is not, therefore, in the way; but its movement takes place sufficiently soon after the grip has passed to enable it to raise the cable in front of it into the jaws of the grip.

To provide for the positive engagement or contact of the grip side with the lever H and prevent the strain of the lever from deflecting the grip from its course or having any tendency to do so, I place in one side of the tube or tunnel the guide-rail L, against which the other side of the grip travels, so as to be held firmly to its course, and thereby effect the positive throw of the operating-lever H.

If by any chance the car should have passed the apparatus without the gripman having seized the cable and it becomes necessary to run the car back by hand, I have attached to the forward end of the lever the extension-arm M, which is set at an inclination in the other direction, so as to traverse across the plane of the grip-slot. Therefore, as the car is run back the grip, coming in contact with this extension-arm, forces the lever H over and, through the lifting-roller, raises the cable, as heretofore described. This extension-arm is made very narrow, so as to provide for sufficient space to work in between the yoke of the tunnel and the side of the grip, and is preferably made of springy material, so as to yield sufficiently and avoid any injury.

In the surface of the cable tube or tunnel I make a trap, (represented by N,) provided with a removable cover $n$, and through this trap the joints of the several parts may be easily reached and said parts placed in position and removed when necessary.

In order to provide a suitable housing in which the lever H may play, I secure in the upper portion of the tube or tunnel at that side an inverted angle-iron bar O, which is secured at one end to the trap-frame and at the other end to one of the yokes of the cable-tube. Within the angle of this bar and underneath it the lever plays and is suitably housed. This angle-iron forms also a substantial support for the street-paving.

To somewhat sustain the overhanging long end of the lever and its extension-arm, I bolt to the under side of the trap-frame the supporting-arm P, which extends under and serves as a guide or rest for the lever to play upon.

I am aware, in cable-railway appliances, of a construction for depressing a cross-cable, consisting of a lever traversing the path of the grip, a roller adapted to bear down upon the cross-cable to depress it, and connecting devices between the lever and the roller for operating the latter; but this is not my invention, and I do not require to depress the cable; but, on the contrary, I require to raise it, and this results in a different arrangement of devices, whereby the result may be accomplished.

I am also aware of the employment of an automatic device for lifting up the cable into the grip, in which the grip strikes with its bottom a suitable mechanism for raising the cable; but my invention is an improvement upon this by striking with the side of the grip, thereby avoiding the tendency, which is present when the grip strikes it from below, of being raised up from its seat on the truck.

Having thus described my invention, what I claim as new, and desire to secure by Letters Patent, is—.

1. In a cable-lifting device, the combination of the roller located under the traveling cable, a rock-shaft having a rigid arm in which the roller is mounted, the swinging lever in the upper portion of the tube or tunnel and crossing the path of the grip, whereby the side of said grip comes in contact with and operates it, and suitable connections between the lever and the roller, whereby the latter is raised to lift the cable into the jaws of the grip, substantially as described.

2. In a cable-lifting device, the combination of the roller in the lower portion of the tube or tunnel and under the traveling cable therein, the rock-shaft by which said roller is carried, and the lever-arm of said shaft, the swinging lever H in the upper portion of the tube or tunnel and crossing the path of the grip, whereby the side of the latter comes in contact with it and operates it, the rod to which the lever is attached, and the pivoted lever-arm carried by the rod and adapted to come in contact with the lever-arm of the rock-shaft, substantially as described.

3. In a cable-lifting device, the combination of the roller in the tube or tunnel and lying under the cable, the swinging lever H in the upper portion of the tube or tunnel and crossing the path of the grip, whereby the side of the grip travels against and operates it, suitable connections between said lever and the roller, whereby the latter is raised up under the cable to lift it, and the fixed guide-rail in the tube or tunnel, against which the other side of the grip moves, whereby its action on the lever is positive, substantially as described.

4. In a cable-lifting device, the combination of the roller in the bottom of the tube or tunnel and under the cable therein, the swinging lever H in the upper portion of the tube or tunnel and crossing the path of the grip, whereby the side of the latter comes in contact with and operates it, connecting devices between the lever and the roller, whereby the latter is raised to lift the cable, and the forwardly-projecting extension-arm M, secured to the forward end of the lever and crossing again the path of the grip, whereby the device may be operated by the backing of the car, substantially as described.

5. In a cable-lifting device, the combination of the roller under the cable for lifting it, the swinging lever in the upper portion of the tube or tunnel and crossing the path of travel of the grip, whereby it is operated, connections between the lever and the roller for raising said roller to lift the cable, and the angle-iron housing in the tube or tunnel, in which the lever plays, substantially as described.

6. In a cable-lifting device, the roller in the lower portion of the tunnel and under the cable therein, the swinging lever in the upper portion of the tunnel and crossing the path of the grip, suitable connections between the lever and the roller, whereby the latter is lifted to raise the cable, the trap-casing in the tube or tunnel over the connections, the yoke of the tube or tunnel, and the angle-iron housing for the lever secured to the trap-casing and to the adjacent yoke, substantially as described.

In witness whereof I have hereunto set my hand.

JOHN CHRISTIAN HENRY STUT.

Witnesses:
    JAS. TOBIN,
    J. H. BLOOD.